(12) United States Patent
Ng et al.

(10) Patent No.: US 6,728,899 B1
(45) Date of Patent: Apr. 27, 2004

(54) ON THE FLY DEFECT SLIPPING

(75) Inventors: WeiLoon Ng, Singapore (SG); YongPeng Chng, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 560 days.

(21) Appl. No.: 09/607,381

(22) Filed: Jun. 30, 2000

Related U.S. Application Data

(60) Provisional application No. 60/141,615, filed on Jun. 30, 1999.

(51) Int. Cl.⁷ .......................... G06F 11/00; G11C 29/00; G11B 5/09
(52) U.S. Cl. .............................. 714/8; 714/54; 714/710; 369/47.14
(58) Field of Search .............................. 714/8, 710, 54; 369/47.14

(56) References Cited

U.S. PATENT DOCUMENTS

| | | | |
|---|---|---|---|
| 3,939,801 A | 2/1976 | Tanaka et al. | 118/637 |
| 4,040,102 A | 8/1977 | Plener et al. | 360/71 |
| 4,149,925 A | 4/1979 | Mintz | 156/361 |
| 4,198,458 A | 4/1980 | Mitsuishi et al. | 428/212 |
| 4,231,828 A | 11/1980 | Mintz | 156/230 |
| 4,257,830 A | 3/1981 | Tsuya et al. | 148/112 |
| 4,319,295 A | 3/1982 | Motoyama et al. | 360/137 |
| 4,463,397 A | 7/1984 | Motoyama et al. | 360/137 |
| 4,571,361 A | 2/1986 | Kawaguchi et al. | 428/328 |
| 4,625,252 A | 11/1986 | Balz et al. | 360/130.21 |
| 4,638,379 A | 1/1987 | Teshima | 360/19.1 |
| 4,698,701 A | 10/1987 | Gantzhorn et al. | 360/16 |
| 4,738,950 A | 4/1988 | Vanier et al. | 503/277 |
| 4,894,733 A | 1/1990 | Odaka | 360/31 |
| 4,935,825 A | 6/1990 | Worrell et al. | 360/54 |
| 4,956,731 A | 9/1990 | Yoshimura | 360/96.3 |
| 4,990,400 A | 2/1991 | Endo et al. | 428/331 |
| 5,008,552 A | 4/1991 | Kuramochi et al. | 235/483 |
| 5,075,804 A | 12/1991 | Deyring | 360/49 |
| 5,093,064 A | 3/1992 | Utsumi et al. | 264/210.7 |
| 5,106,681 A | 4/1992 | Endo et al. | 428/323 |
| 5,142,424 A | 8/1992 | Hatamura | 360/104 |
| 5,142,515 A | * 8/1992 | McFerrin et al. | 369/30.11 |
| 5,271,018 A | 12/1993 | Chan | 371/10.2 |
| 5,319,627 A | * 6/1994 | Shinno et al. | 369/53.17 |
| 5,364,040 A | 11/1994 | Kaplan | 242/347 |
| 5,368,997 A | 11/1994 | Kawamoto | 430/533 |
| 5,379,171 A | 1/1995 | Morehouse et al. | 360/10.5 |
| 5,421,003 A | 5/1995 | Escola et al. | 395/575 |
| 5,449,419 A | 9/1995 | Suzuki et al. | 148/306 |

(List continued on next page.)

*Primary Examiner*—Robert Beausoliel
*Assistant Examiner*—Emerson Puente
(74) *Attorney, Agent, or Firm*—Kirk A. Cesari

(57) ABSTRACT

A disc drive includes a base and a disc rotatably attached to the base. The disc drive also includes a defect management system for managing defective sectors located on the disc surface of a disc within the disc drive. The defect management system includes a controller, and a memory associated with said controller. The controller skips at least a first defective sector and a second defective sector. The first defective sector may be contiguous with the second defective sector or at least one writable sector is located between the first defective sector and the second defective sector. The controller also controls the head to write at least the last two sectors of the plurality of sectors to be written to at least two contiguous sectors located in a pool of spare sectors. A method for writing a plurality of sectors of information to a storage surface on a disc in a disc drive includes determining the start location for writing the plurality of sectors; and determining a number of skipped defective sectors that will be encountered when writing the plurality of sectors. At least two sectors of the plurality of sectors are reassigned and written to at least two sectors in a spare sector pool. The method includes storing the location of the spare sectors within the spare sector pool so that the spare sectors may be located at a subsequent time during a read operation.

16 Claims, 7 Drawing Sheets

U.S. PATENT DOCUMENTS

| | | | |
|---|---|---|---|
| 5,461,523 A | 10/1995 | Hoshi | 360/99.12 |
| 5,528,571 A * | 6/1996 | Funahashi et al. | 369/53.17 |
| 5,579,189 A | 11/1996 | Morehouse et al. | 360/105 |
| 5,583,842 A | 12/1996 | Wilson et al. | 369/54 |
| 5,592,349 A | 1/1997 | Morehouse et al. | 360/98.08 |
| 5,694,267 A | 12/1997 | Morehouse et al. | 360/97.02 |
| 5,740,358 A | 4/1998 | Geldman et al. | 395/184.01 |
| 5,748,578 A | 5/1998 | Schell | 369/44.14 |
| 5,760,986 A | 6/1998 | Morehouse et al. | 360/67 |
| 5,841,748 A * | 11/1998 | Yamamuro | 369/47.14 |
| 6,025,966 A * | 2/2000 | Nemazie et al. | 360/53 |
| 6,212,647 B1 * | 4/2001 | Sims et al. | 714/8 |
| 6,385,736 B1 * | 5/2002 | Jeong et al. | 714/8 |
| 6,510,114 B1 * | 1/2003 | Yeo et al. | 369/53.2 |

* cited by examiner

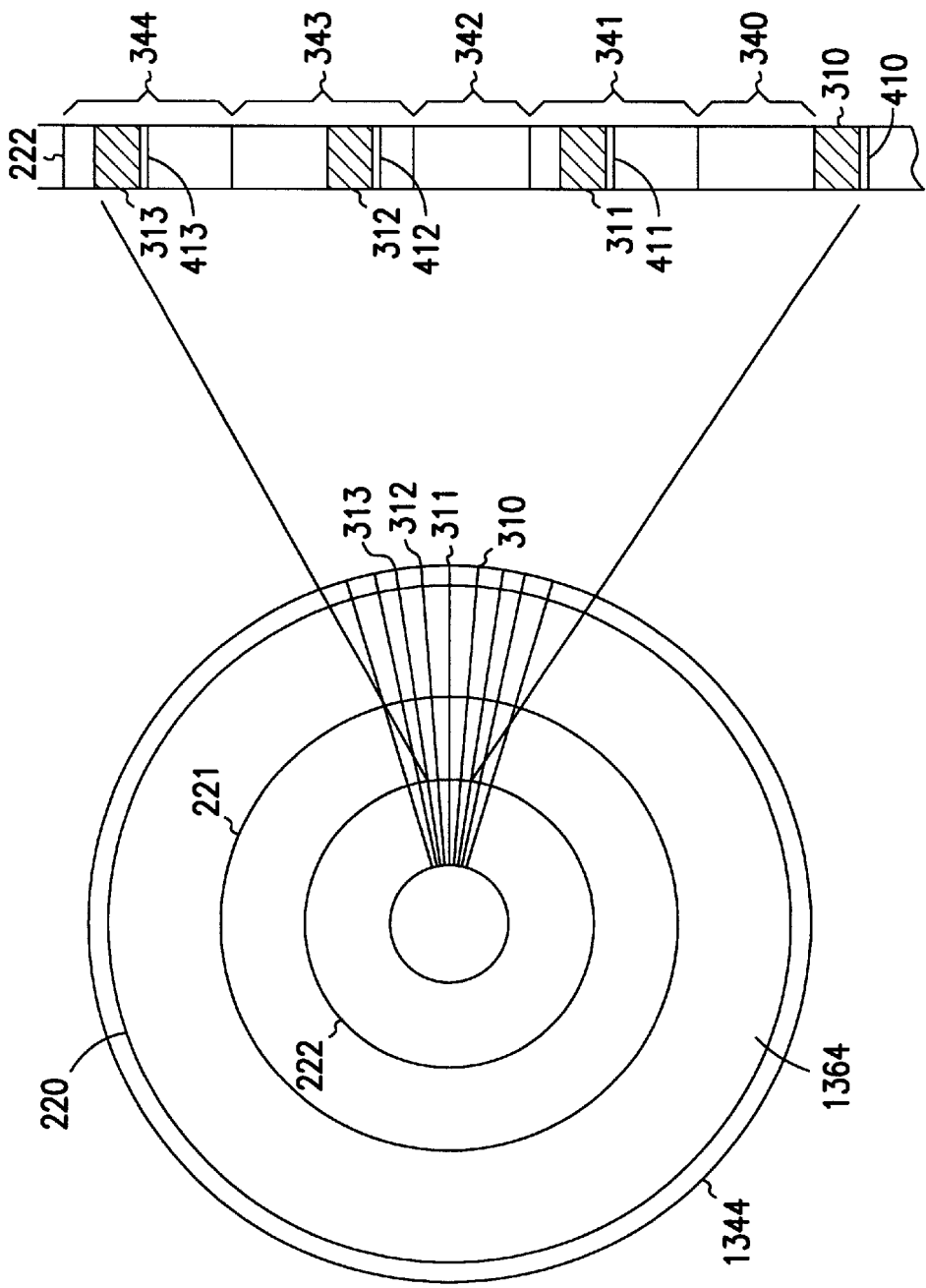

ON THE FLY DEFECT SLIPPING

RELATED APPLICATION

This application claims the benefit of U.S. Provisional Application Ser. No. 60/141,615, filed Jun. 30, 1999 under 35 U.S.C. 119(e).

FIELD OF THE INVENTION

The present invention relates to the field of mass storage devices. More particularly, this invention relates to an apparatus and method for passing over, or more specifically slipping, defective sectors on disc surfaces within a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface (ABS) which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

Each track on a disc surface in a disc drive is further divided into a number of short arcs called sectors. The sector typically holds 512 bytes of information representing data. The number of sectors on a track used to be fixed wherever the track was located on the disc surface. Now, the number of sectors held on a track varies depending on the zone which the track is in. Typically, more sectors will be stored on the tracks at the outer diameter which are in the zone toward the outer diameter of the disc.

When a disc is manufactured, there is a possibility that there may be defects on the disc. The defects typically can result in sectors or tracks that have doubtful, dangerous, or damaged magnetic media, which would otherwise put the customer's data at risk. These defects are to be avoided so that information representative of data is not written to a location where the data could be lost. Typically, each disc surface is checked for defects at the time of manufacture. A sector is considered defective if a number of retries must be used to recover the data on the sector. A sector is also considered defective if data written to the sector is not recoverable. The location of any defective sectors found are kept in memory on a table or map which is unavailable to end users. This table or map is used to reallocate sectors or remap the sectors on the disc drive so that, at a future time the defective sectors are not used again.

Not all defective sectors are found at the time of manufacture. Defective sectors can occur after a disc drive is manufactured and there is generally a system in place for handling newly defective sectors. Defects found after the time of manufacture are sometimes termed as grown defects. There are many sources for grown defective sectors. For example, sometimes a defective sector can be found after an inadvertent contact between the slider and the disc. Again, the location of the defective sector or track is stored in memory so that the defective sector is not reused.

There are two basic schemes or systems for handling defective sectors. One scheme is to provide spare sectors either on the track, within the cylinder or at the inner diameter of the disc. In the spare sector scheme, spare sectors could be provided on a track or within a cylinder. A cylinder is a group of tracks from different disc surfaces located at substantially the same radial distance from the center of the disc. If a defective sector was located, the location of the defect was stored in memory and the spare sector on the track or within the cylinder was located and the information representing the data was written to the spare sector. In other instances, the spare sector was not kept on the track or in the cylinder but was kept elsewhere on the surface or surfaces of the disc drive. In this scheme, a pool of spare sectors was kept off track or outside of the cylinder.

In each of these schemes, if a spare is used, the access time of the disc drive suffered. A constant industry goal is to reduce the access time to data on the disc drive. When a spare sector is used, and the spare is located on the track, the disc generally has to undergo an additional revolution to get to the spare sector, read the spare sector and then return to the point after the defective sector. If the spare is within the cylinder, many times an extra revolution is still required. If the spares on a track or within a cylinder are not used, then the disc drive wastes storage space which reduces the potential usable capacity. Placing spare sectors in a pool off track or outside of the cylinder balances wasting capacity with reduced access time. Over time, the total number of defective sectors within a disc drive are dropping. In such a drive, defective sectors are few. However, in the event of encountering a defective sector, the access time is longer than the access times associated with storing the spare within the cylinder or on the track since several seeks must be done to get to the spare sector and then back to the track from which the transducer head is reading or writing. For example, when a defective sector is found, an access must be done to the spare that replaces it, the information on the spare must be read and then a seek back to the track must be performed so that the information after the spare can be read and added to the information to complete the information or data request sent by a host computer. During each seek, a revolution may be lost which adds to the access time. If the spare sectors are kept at a location very far from the tracks being read, the actuator movements associated with the various seeks will increase the access time to the data dramatically. In addition, if there are several defective sectors in string of sectors storing a long record of information, the procedure for seeking to spares must be repeated generally as many times as there are defective sectors. For example, if there are three discontinuous defective sectors, the process of accessing to the spare, reading it and accessing back to the track where the defective sector was found must be done three times to complete a request for information or data. Access times suffer greatly in this situation.

Another scheme is called defect slipping. This scheme of handling defects is generally used at the time of manufacture of the disc drive. In essence, when a defective sector is found, the defective sector is skipped and the next good sector available is used as the next sector. Defect slipping skips over defective sectors and keeps the locations of the defects in a large table. The good sectors used are sequentially numbered as logical block addresses. Large buffer memories are used to store a large table for mapping each logical block address to a physical location on the disc surface. Compared to the spare sector method, this procedure reduces the number of seeks necessary to obtain the information. One of the problems associated with this method is that it is generally unavailable for "grown defects" which occur after manufacture. Since the defective sectors are merely skipped and the next sector is slipped to a position past the defective sector, the defect slipping technique requires that the sectors are available to slip to. This situation occurs at manufacture. After manufacture, most of the sectors are usually designated as good sectors and few spare sectors are positioned within the disc drive so that they are available to be slipped to. If spares were provided to allow for defect slipping after manufacture, large amounts of potential storage capacity would be wasted. Consequently, after manufacture, defect slipping is generally not a viable option for handling defective sectors.

What is needed is a method and apparatus for dealing with defective sectors that reduces access times. What is also needed is a process which reduces the number of seeks needed to recover information from a pool of spare sectors for long records of data or for information that include multiple defective sectors. Furthermore, there is a need for a scheme for handling defective sectors that keeps wasted storage space to a minimum, yet accurately substitutes spare sectors in for defective sectors within the disc drive.

SUMMARY OF THE INVENTION

A method for writing a plurality of sectors of information to a storage surface on a disc in a disc drive includes determining the start location for writing the plurality of sectors; and determining a number of skipped defective sectors that will be encountered when writing the plurality of sectors. A first defective sector is skipped and the next logical block address is written to the next non defective sector after the first defective sector. A second defective sector is skipped and the next logical block address is written to the next non defective sector after the second defective sector. At least two sectors of the plurality of sectors are reassigned and written to at least two sectors in a spare sector pool. At least two of the last sectors of the plurality of sectors to be written are reassigned to two sectors within the spare sector pool. The first defective sector and the second defective sector are noncontiguous sectors. The sectors of the spare sector pool may be contiguous sectors within the spare sector pool. The sectors in the spare sector pool also may be located a track on the disc. The method includes storing the location of the spare sectors within the spare sector pool so that the spare sectors may be located at a subsequent time during a read operation.

At least the number of skipped sectors of the plurality of sectors to be written are written to a spare sector pool located a track on the disc. A number of the sectors at the end of the plurality of sectors equal to the number of skipped sectors of the plurality of sectors are reassigned and written to a number of sectors in the spare sector pool equal to the number of skipped sectors of the plurality of sectors. The number of sectors in the spare sector pool is also equal to the number of skipped sectors of the plurality of sectors that were to be written.

A defect management system for a disc drive for managing defective sectors located on the disc surface of a disc drive includes a controller, and a memory associated with said controller. The memory also includes a first portion storing locations of a plurality of defective sectors, and a second portion for storing an instruction set which controls a head during a write operation for writing a plurality of sectors. The controller skips at least a first defective sector and a second defective sector. At least one writable sector is located between the first defective sector and the second defective sector. The controller also controls the head to write at least the last two sectors of the plurality of sectors to be written to at least two contiguous sectors located in a pool of spare sectors.

Advantageously, the disc drive which uses the above inventions reduces the access times associated with obtaining information from sectors that include defective sectors which need to be reassigned. The actuator movements associated with reading from a set of sectors having reassigned sectors many times will be reduced to one extra seek to a set of spare sectors. This reduction in access time can significantly enhance the performance of the disc drive, especially if there are a large number of reassigned sectors on the disc drive. The time for writing information representative of data using this method requires no additional time and may require less time. The method and apparatus also efficiently and accurately accesses the spare sectors from the spare sector pool located on the disc drive.

BRIEF DESCRIPTION OF THE DRAWINGS

FIG. 3 is a schematic representation of one of the tracks from the cylinder from the disc pack shown in FIG. 2.

FIG. 4 is a schematic representation of a portion of the track shown in FIG. 3. which includes a track identification field, sectors for storing information representative of data, and servo information.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
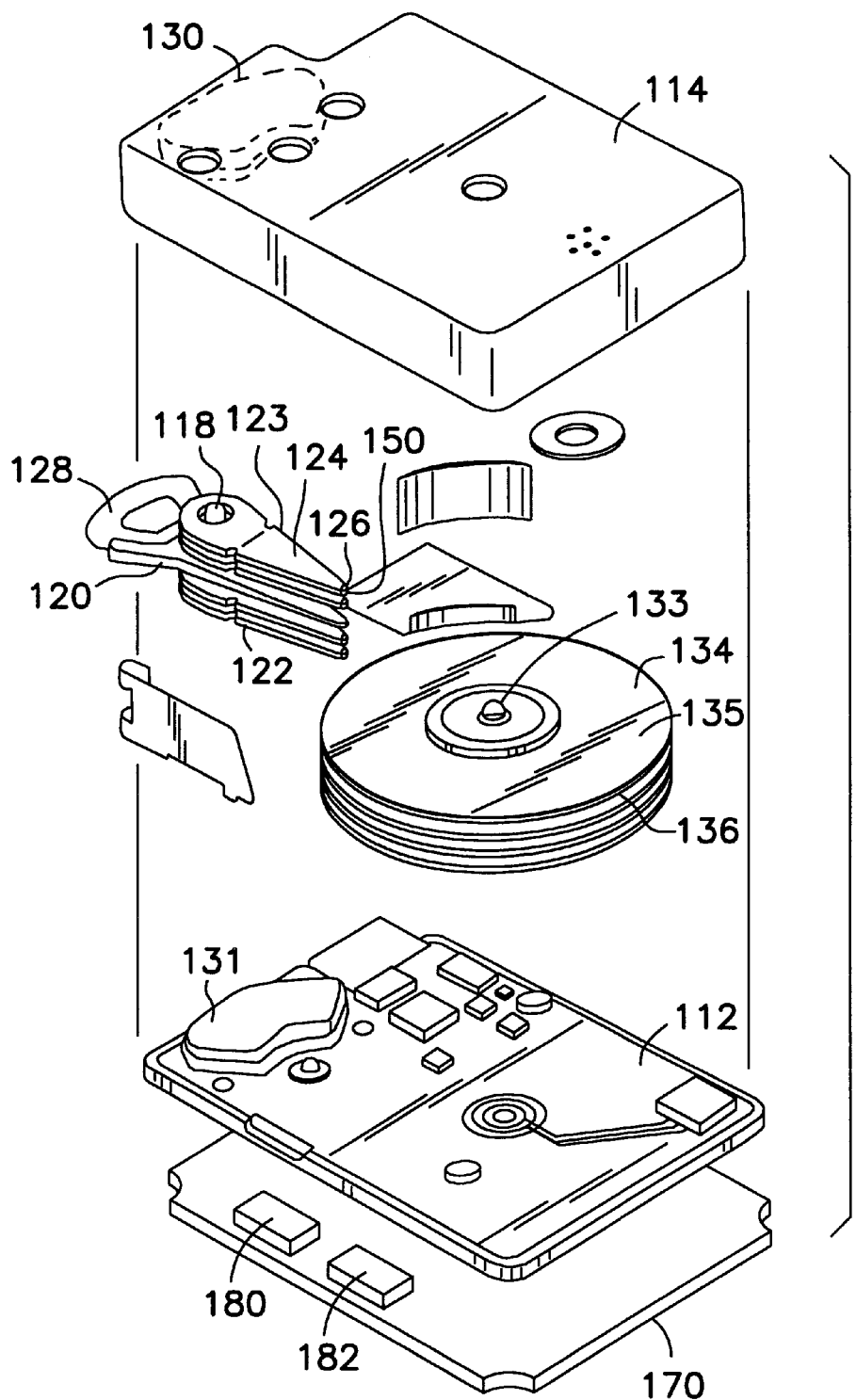
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a first recording surface 135 and a second recording surface 136. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub. The disc drive also includes a printed circuit card 170 which is attached to the base 112 of the disc drive 100. The printed circuit card 170 includes a controller 180 and random access memory 182 which the controlled accesses to control various aspects of the disc drive. The aspect of the disc drive controlled of interest is the control of the interface between a host computer and the disc drive and more specifically, the control of mapping logical block addresses to physical sector locations on a particular disc 134.

Figure 2:
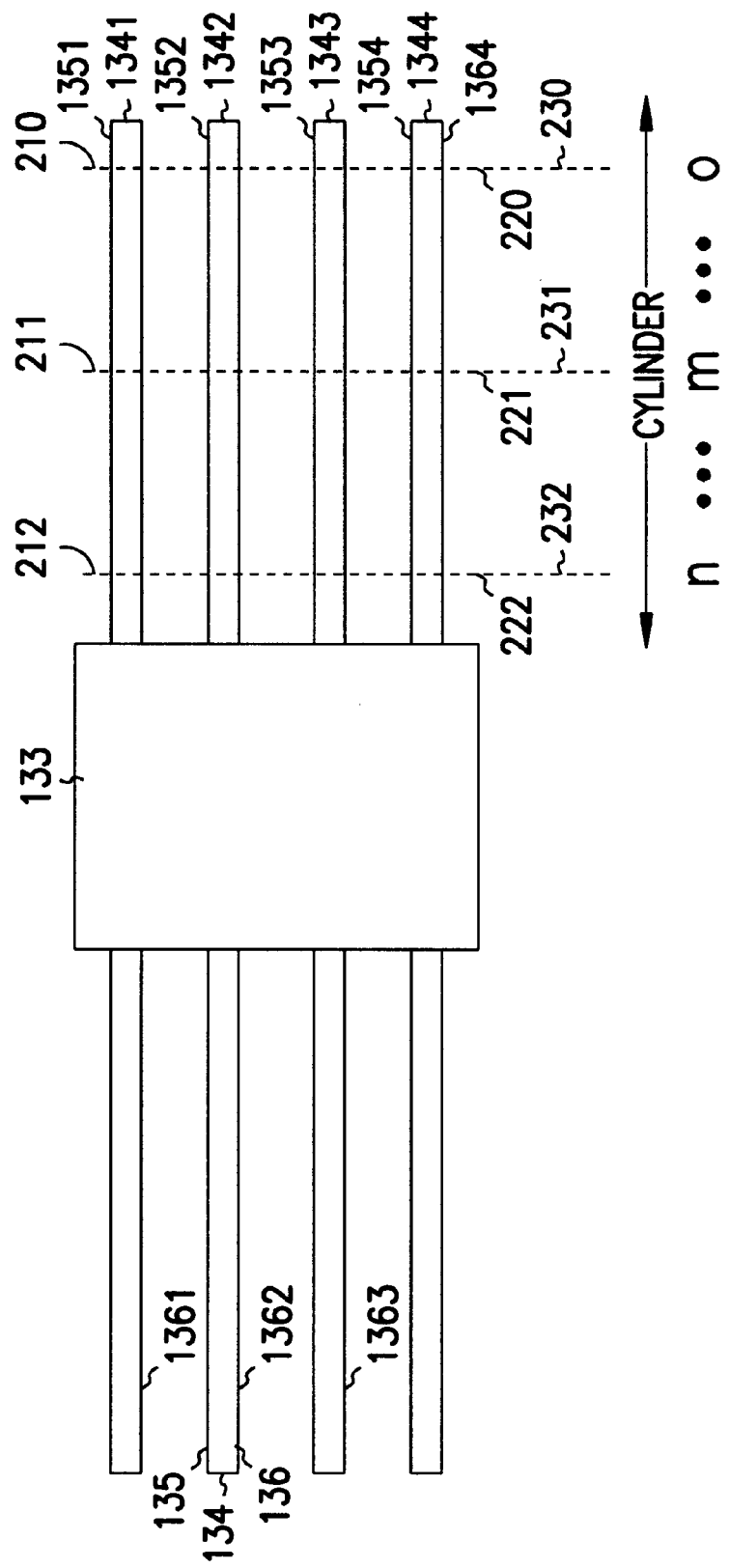
FIG. 2 is a cutaway schematic representation of the discs of a disc drive showing a set of tracks within a cylinder.

FIG. 2 is a cutaway schematic representation of the discs 134 of the disc drive 100. As shown in FIG. 2, each of the discs 134 has a first recording surface 135 and a second recording surface 136. Each of the discs is also attached to the spindle hub 133. In FIG. 2, each of the discs 134 is individual numbered as 1341, 1342, 1343, and 1344. Each disc also has a first recording surface 1351, 1352, 1353, 1354 and a second recording surface 1361, 1362, 1363, 1364. Information representing data is stored along a track on a recording surface of a disc. As shown in FIG. 2, there are three tracks 210, 211, and 212 on recording surface 1351 of disc 1341. The tracks occur on each of the disc surfaces 1351, 1352, 1353, 1354, 1361, 1362, 1363, 1364 and are shown as tick marks on each of the disc surfaces. Similar tracks are shown as tracks 220, 221 and 222 on surface 1364 of disc 1344. Generally, modern-day disc drives have many more than three tracks on a disc. For example, certain disc drives may have more than 4,000 tracks on a 3.5 inch disc platter. The tracks shown 210, 211, 212, 220, 221 and 222 show sets of tracks which are at the outer diameter 210, 220 and a set of track that represent tracks at the inner diameter 212 and 222, and a set of tracks at an intermediate diameter 211 and 221. FIG. 2 illustrates that each of the discs 1341, 1342, 1343 and 1344 have a first and a second recording surface. Each of the recording surfaces has a set of tracks thereon. Therefore, tracks are found on a particular recording surface. FIG. 2 also illustrates the concept of cylinders. A cylinder is a set of tracks that are at substantially the same radial distance away from the center of a set of discs. For example, tracks 212 and 222 and all the tracks in between tracks 212 and 222 form a cylinder 232 at the inner diameter of the disc pack. All the tracks at the same radial distance as tracks 211 and 221 on all the recording surfaces of the discs 1341, 1342, 1343, 1344 form a cylinder 231 at an intermediate diameter with respect to the disc pack. Finally, all the tracks between tracks 210 and 220 form a third cylinder 230 at the outer diameter of the disc pack. Thus, cylinders are grouping of tracks across two or more recording surfaces. It should be noted that the concept of cylinders is equally applicable to a single disc type disc drive as well as to a multi-disc disc drive. It should also be noted that the number of cylinders will be generally equal to the number of tracks on the surface of the discs in the disc drive. In FIG. 2, the cylinder at the outer diameter is cylinder 0, and the cylinder at the inner diameter is cylinder N, which also carries a reference number 232. It should be noted that generally the tracks are invisible to the naked eye when viewing a disc and that the markings shown in FIGS. 2, 3 and 4 are for the sake of illustration.

FIG. 3 is a schematic representation of one of the discs 1344 of the disc pack shown in FIG. 2. Specifically, recording surface 1364 of disc 1344 is shown in FIG. 3 as are tracks 220, 221 and 222. Disc surface 1364 includes embedded servo information which appear as lines 310, 311, 312, and 313 in FIG. 3. The lines 310, 311, 312 and 313 are actually wedges of servo information used to locate the transducer or one of the transducers 150 in a slider over a selected track on a disc. The servo information 310, 311, 312 and 313 also may include other information such as track ID or track identification portion which is used to identify the track.

FIG. 4 is a schematic representation of a portion of the track 222 shown in FIG. 3. The portion of the track 222 shown in FIG. 4 represents a very small arcuate portion. The arc is so small that, for the sake of simplicity, portions of the track 222 that is shown is illustrated as though it were along a line. Track 222 includes the servo information 310, 311, 312, 313 as well as several sectors 340, 341, 342, 343, 344 which are used to store information representing data on the track. The servo information 310, 311, 312, 313 is equally spaced along the track portion 222. Sectors are generally 512 bytes long and may be at the beginning or end of a particular piece of servo information or may be split by servo information. For example, sectors 340 and 342 are whole sectors which are not cut or split by servo information. Meanwhile, sector 341 is cut by servo wedge 311, sector 343 is cut by servo wedge 312 and sector 344 is cut by servo wedge 313. The servo portions or wedges 310, 311, 312, 313 each include locational information which is used to center a transducer over the centerline of the track 222. In addition, each bit of servo information includes a track identification field which includes information to identify the track as well as other information about the track. In this particular embodiment, the even servo wedges 310 and 312 store a type of servo information for a read head while the odd servo wedges 311 and 313 store servo information in the track identification field for the write element of the transducer. The track identification fields are shown as reference numerals 410, 411, 412, 413.

Figure 5:
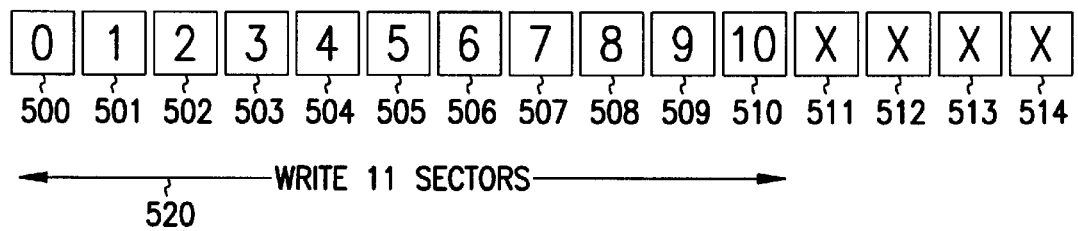
FIG. 5 is a diagram showing 15 sectors from a track as a series of blocks.

FIG. 5 is a diagram showing 15 sectors from a track. The physical block addresses are depicted by the block numbers below the actual blocks. In other words, the first block has a physical block address of 500, the second block has a physical address of 501. Remaining blocks 502, 503, 504, 505, 506, 507, 508, 509, 510, 511, 512, 513 and 514 are physical block locations from a track on a disc 134. The sectors 500 to 514 are shown without servo information or without track identification fields for the sake of clarity. Also shown in FIG. 5, as depicted by arrow 520, is that the disc drive has received a write command to write 11 sectors having logical block addresses 0, 1, 2, 3, 4, 5, 6, 7, 8, 9, 10. As shown in FIG. 5, if there are no defective sectors within the set of physical block addresses to which the 11 sectors are going to be written, then the 11 sectors may be written sequentially from the designated starting location, physical address 500 to physical sector location 510. As shown in FIG. 5, the logical block addresses are placed within the physical blocks to which the data is to be written. For example, logical block address 0 is within physical sector 500, logical block address 1 is within physical sector 501, and physical block address 10 is within block 510.

Figure 6:
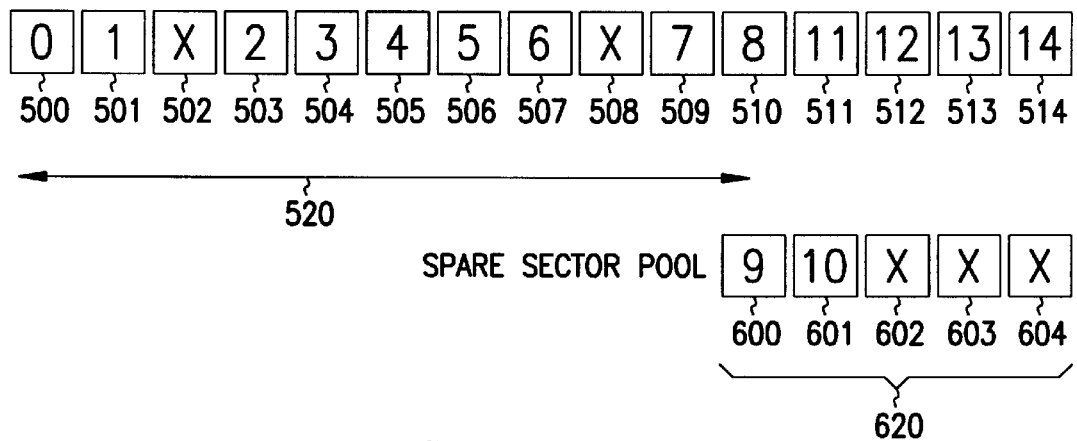
FIG. 6 is a diagram showing 15 sectors from a track as a series of blocks as well as a several sectors from a spare sectors pool.

FIG. 6 is a diagram showing 15 sectors from a track. In FIG. 6, physical sectors 502 and 508 have been determined to be defective sectors. In this instance, the defective sectors are from grown defects. Again, the write command 520 is received in which logical block addresses 0 through 10 must be written from a starting sector 500 and through physical sector 510. Logical block 0 is written to physical sector 500 and logical block address 1 is written to physical sector 501. Physical sector 502 is determined to be defective and is skipped. Logical block address 2 from the write command is therefore written to physical sector 503. The process of skipping block 502 and writing the next logical block address from the write command to the next available or non-defective sector 503 is called slipping. Therefore, some would say that logical block address 2 from the write command 520 has been slipped to sector 503. The logical block addresses or information from the write command continues to be slipped by one physical block until a second defective sector 508 is encountered. In other words, logical block address 3 is written to physical sector 504, logical block address 4 is written to sector 505, logical block 5 is written to physical sector 506, and logical block 6 is written to physical sector 507. The next physical sector 508 is determined to be defective and is therefore skipped. The next logical block address 7 is therefore written to the next available sector 509, and logical block address 8 is written to physical sector 510. The logical block addresses 7 and 8 are therefore slipped by two sectors. Physical sector 511 is filled with data depicted by logical block address 11, and therefore cannot be overwritten. To complete the write, the actuator assembly 120 is used to move the transducer head 150 to a different track which contains a pool of spare sectors. The pool of spare sectors includes sectors 600, 601, 602, 603, and 604.

Typically, the spare sector pool will be located on another track of the disc drive and also within another cylinder. Typically, the spare sector pool is positioned near the inner diameter of the disc or at an inner diameter cylinder of the disc drive. Completing the write is accomplished by writing logical block address 9 and logical block address 10 to two contiguous spare sectors 600 and 601 from the spare sector pool. By slipping the logical block addresses until after all the defective sectors are encountered and writing the last sectors to contiguous sectors in the spare sector pool, one or more seeks to the spare sector pool are saved which increases the access time. In other words, by slipping the sectors and writing to contiguous sectors in the spare sector pool, only one seek needs to be done to the spare sector pool to complete the write command. Also, advantageously, when the data is being read in response to a read command the access time is also reduced since there is only one actuator seek required to read the 11 blocks or logical block addresses. For example, when a read command comes down to read the 11 sectors corresponding to logical block address 0 to . . . 10, there needs to only be one actuator seek to the spare sector pool despite the fact that two defective sectors are encountered within the physical sector starting from physical sector 500. This cuts down the seek time significantly since there does not have to be two seeks to a spare sector pool 620. As shown in FIG. 6, the last logical block addresses 9 and 10 corresponding to the write command are written to the spare sector pool 620. This does not have to be the case as illustrated by FIG. 7.

Figure 7:
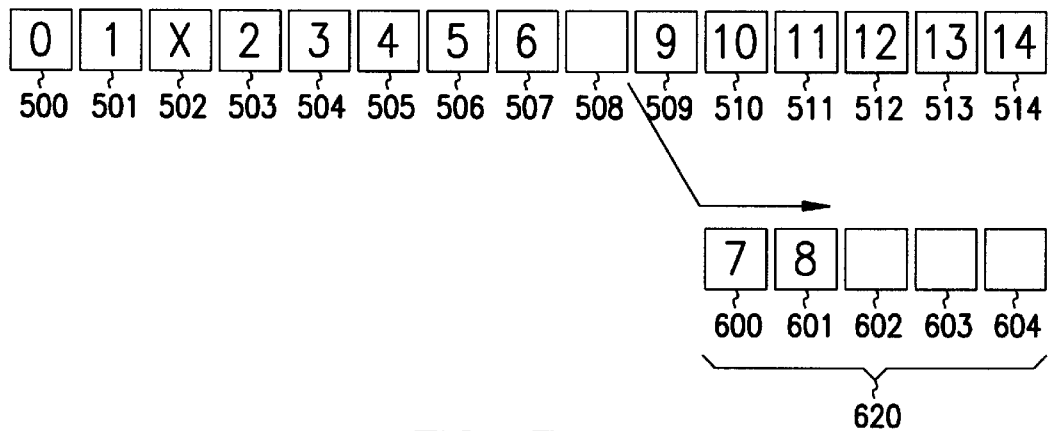
FIG. 7 is a diagram showing 15 sectors from a track as a series of blocks as well as a several sectors from a spare sectors pool.
Figure 8:
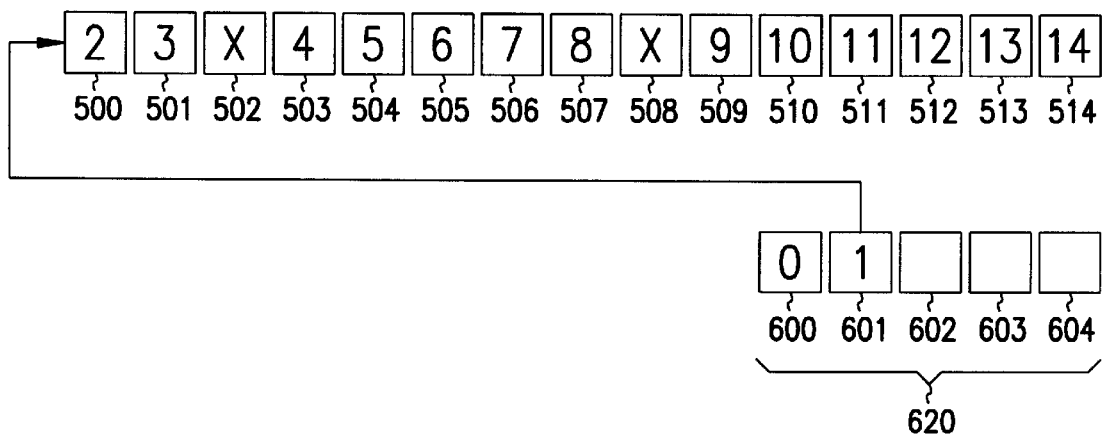
FIG. 8 is a diagram showing 15 sectors from a track as a series of blocks as well as a several sectors from a spare sectors pool.

FIG. 7 shows a diagram showing 15 sectors from a track as well as a spare sector pool. As shown in FIG. 7, physical sectors 502 and 508 are still defective. In this case, the logical block addresses are slipped until the last defective sector 508 is encountered. After the last defective sector is encountered, the number of logical block addresses corresponding to the number of skipped defective sectors are written to the spare sector pool 620. In this case, logical block addresses 7 and 8, which correspond to two defective sectors, are written to physical sectors 600 and 601 of the spare sectors pool 620. To complete the write command 520, logical block addresses 9 and 10 are written to physical block addresses 509 and 510, respectively. It should be noted that not just the last logical block addresses need to be written to the spare sectors pool 620 in order to implement the invention. For example, as shown in FIG. 7, the logical block addresses 7 and 8 are written to the spare sectors pool 620 and then logical blocks 9 and 10 are written to physical sectors 509 and 510, respectively. It should also be noted that other spare sectors could also be written to the spare sector pool. For example, if the number of defective sectors are known in a number of sectors following the starting sector 500, then a number of consecutive logical block addresses from the write command corresponding to the number of defective sectors can be written to the spare sectors pool. For example, if two defective sectors are going to be encountered, then logical block addresses 0 and 1 could be written to the spare sectors 600 and 601 of the spare sectors pool at the beginning of the write command and the remaining logical block addresses could be written to physical sectors 500, 501, 503, 504, 505, 506, 507, 509, and 510. This, for example, maybe useful if the spare sectors pool has been accessed at the end of a previous write command and the actuator is presently positioned over the spare sector pool at the time of receiving the next write command. In other words, this scheme could be used in order to cut down access times associated with a write command. It should also be noted that if the disc drive 100 has just executed a read command and is ending up on the spare sectors pool 620, the write command could be started out by writing the first logical block addresses to the spare sectors pool and then starting at the physical block address 500. This is shown in FIG. 8 where logical block addresses 0 and logical block address 1 of the write command are written to physical sectors 600 and 601, respectively, of the spare sector pool 620. Then starting at the starting physical sector number 500, logical block address 2 is written to the starting block 500. Logical block address 3 is written to physical sector 501, and physical sector 502 is skipped as it is a defective sector. Logical block address 4 is written to sector 503, logical block address 5 is written to sector 504, logical block address 6 is written to physical sector 505, logical block 7 is written to sector 506, and logical block address 8 is written to physical sector 507. Physical sector 508 is skipped as it is a defective sector and then the next available sector is written to. In this case, logical block address 9 is then written to sector 509, and logical block address 10 is written to sector 510 in order to complete the write command. This particular scheme, as mentioned previously, may be very useful in cutting down write access times when the actuator and transducer 150 are positioned over the spare sector pool 620 at the beginning of a write command. The scheme shown in FIG. 8 would also have the same advantages as those shown in the previous examples of FIGS. 6 and 7 in that only one seek to the spare sector pool must be used in order to accomplish the read command despite the fact that a plurality of sectors are encountered in the physical sectors after the starting physical sector.

It should be noted that if the number of physical sectors which contain defects is known, then the spare sector pool can be accessed and the number of logical block addresses corresponding to the number of physical defects that will be encountered between the starting physical sector 500 and the ending physical sector 510 can be written to the spare sector pool. It literally makes no difference in terms of access times for both the read and the write as long as the number of contiguous sectors written to the spare sector pool correspond to the number of defective sectors found between the starting physical sector and the ending physical sector are written to the spare sector pool 620.

Figure 9:
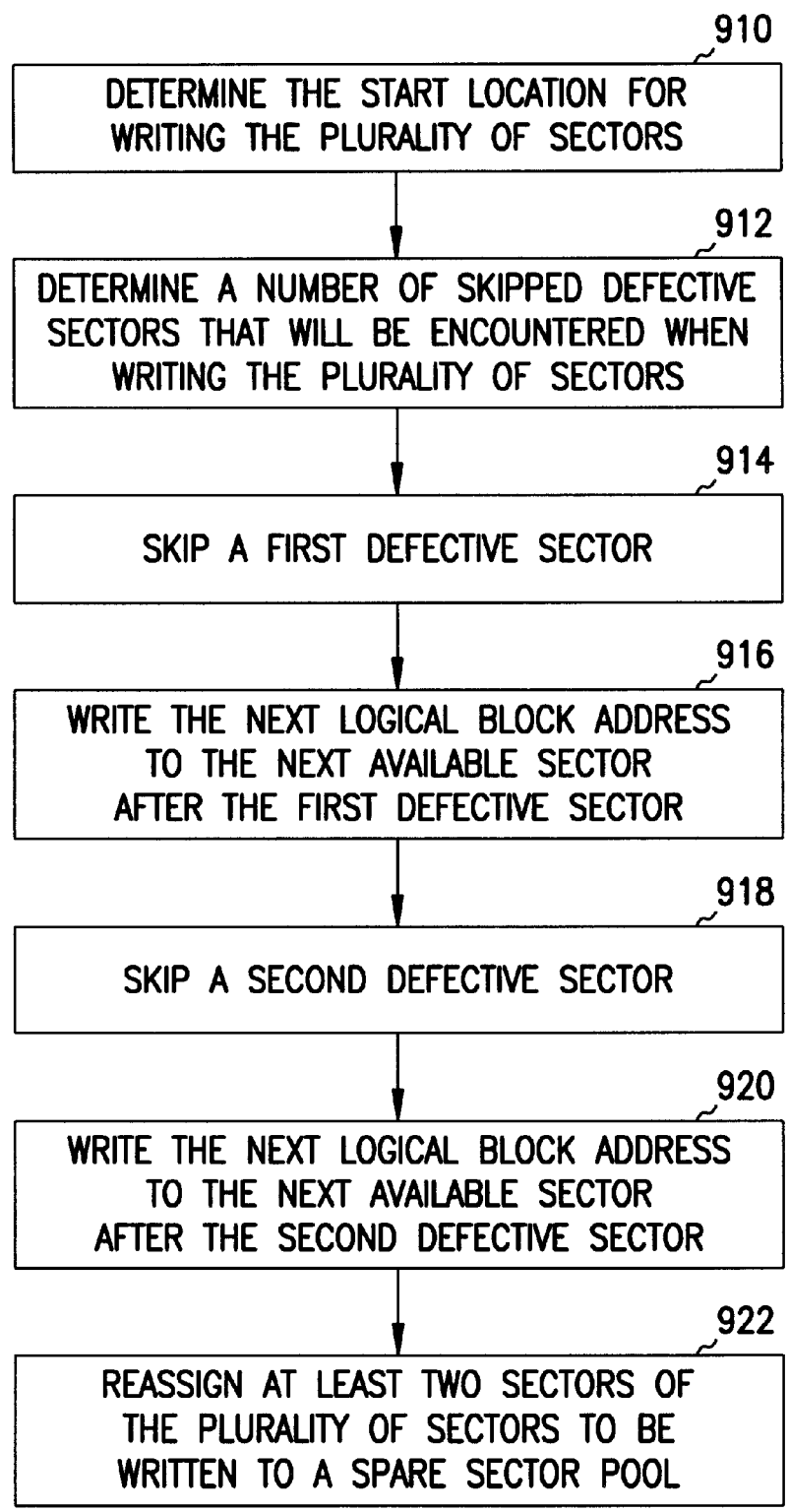
FIG. 9 is a flow diagram writing the logical block addresses to a physical location on the disc drive as practiced by this invention.

FIG. 9 is a flow diagram for writing the logical block addresses to the physical locations on the disc drive as practiced by this invention. As shown in FIG. 9, the first step is to determine the starting physical location for writing the plurality of sectors associated with the write command, as depicted by reference numeral 910. The next step, as depicted by reference numeral 912, is to determine the number of skipped defective sectors that will be encountered when writing the plurality of sectors. In other words, the number of defective sectors between the starting physical sector and the ending physical sector are determined. A first defective sector is skipped, as depicted by reference numeral 914, and the next logical block address is written to the next available sector after the first defective sector, as depicted by reference numeral 916. A second defective sector is skipped as depicted by reference numeral 918, and the next logical block address is written to the next available sector after the second defective sector, as depicted by reference numeral 920. At least two sectors of the plurality sectors are then written to sectors within the spare sector pool as depicted by reference numeral 922.

Advantageously, the disc drive which uses the above inventions reduces the access times associated with obtaining information from sectors that include defective sectors which need to be reassigned. The actuator movements associated with reading from a set of sectors having reassigned sectors many times will be reduced to one extra seek to a set of spare sectors. This reduction in access time can significantly enhance the performance of the disc drive, especially if there are a large number of reassigned sectors on the disc drive. The time for writing information representative of data using this method requires no additional time and may require less time. The method and apparatus also efficiently and accurately accesses the spare sectors from the spare sector pool located on the disc drive.

A more general aspect of this invention is that defects that occur after manufacture may be slipped "on the fly". In other words, in the past, there was no slipping of defects after finding the initial defects during the manufacturing process. With this particular invention, a grown defect may result in just one sector being slipped by the drive. Examples best illustrate this point. In a first example, if the a track with physical sectors "0,bad1, 2, 3, 4, 5, 6, 7, 8, spare9, spare10" (sector 1 is bad, and physical sectors 9 and 10 are spares) is mapped during factory testing, the logical sectors would be "0, x, 1, 2, 3, 4, 5, 6, 7, 8, spare10", In other words, physical sector 1 is skipped. The skipped sector is indicated by the "x".

Once this configuration is determined by the factory, it remains unchanged when the drive is shipped out. If a new defect (also referred to as a grown defect) is found later in current drives it cannot be slipped. For example, if logical sector 3 is newly bad then the sector is as follows: "0, x, 1, 2, newly bad 3, 4, 5, 6, 7, 8, spare10", In current drives, spare sector 10 will replace logical sector 3. Therefore the final configuration of the string of sectors will be: "0, x, 1, 2, x, 4, 5, 6, 7, 8, 3" (spare 10 is used to replace newly bad logical sector 3. Sectors 4, 5, 6, 7, 8 remains at their location.

In this invention, defects are slipped "On-The-Fly" when the drive is out of factory. The slipping can be done immediately and applied immediately when the user attempts to write to the bad sector. The actual implementation of the method of varies with the length of the write command and will work if the user writes to the known defective sector.

In a first example, a write command is issued to logical sector 0 with length 3: to "0, x, 1, 2, newly bad3, 4, 5, 6, 7, 8, spare10" and nothing is changed because newly bad logical sector3 is not touched. Newly bad 3 indicates a grown defect or a defect that occurred after the disc drive left the factory.

In a second example, the user will attempt to write to a bad sector resulting from a grown defect. In the second example, a write command is issued to logical sector 0 with length 4 sectors. The result of logical block addresses is as follows: "0, x, 1, 2, x, 3, 5, 6, 7, 8, 4". Since the length is 4 sectors, the original data stored in logical sector 4 will be replaced. Therefore the method over-writes this location with the new logical sector 3 data and then use spare10 to replace logical sector 4.

In a third example, a write command is issued to logical sector 0 with length 6: "0, x, 1, 2, x, 3, 4, 5, 7, 8, 6". Since the length is 6, the original data stored in logical sectors 4, 5, 6 will be replaced so the method over-writes these locations with the new data and then use spare10 to replace logical sector 6.

If the number of sectors skipped over is less than 2, it may appear that there is no performance gain. However if sectors are being re-written repeatedly, chances of skipping over 2 or more sectors increases.

A final example further illustrates the "On-the-Fly" reassignment to slip sector conversion. In this example, a write command with length greater or equal to 9 sectors is issued to logical sector 0 of "0, x, 1, 2, newly bad3, 4, 5, 6, 7, 8, spare10" and all the sectors after logical sector 2 are changed because each of the sectors is changed on the fly. The write sequence becomes "0, x, 1, 2, x, 3, 4, 5, 6, 7, 8". In this example, all logical sectors after logical sector 2 are replaced. Sector 3 is converted on the fly to sector 4, sector 4 is converted on the fly to sector 5, sector 5 is converted on the fly to sector 6, sector 6 is converted on the fly to sector 7, sector 7 is converted on the fly to sector 8, and sector 8 is converted on the fly to sector spare 10. Logical sector 8 is moved to spare 10.

Figure 10:
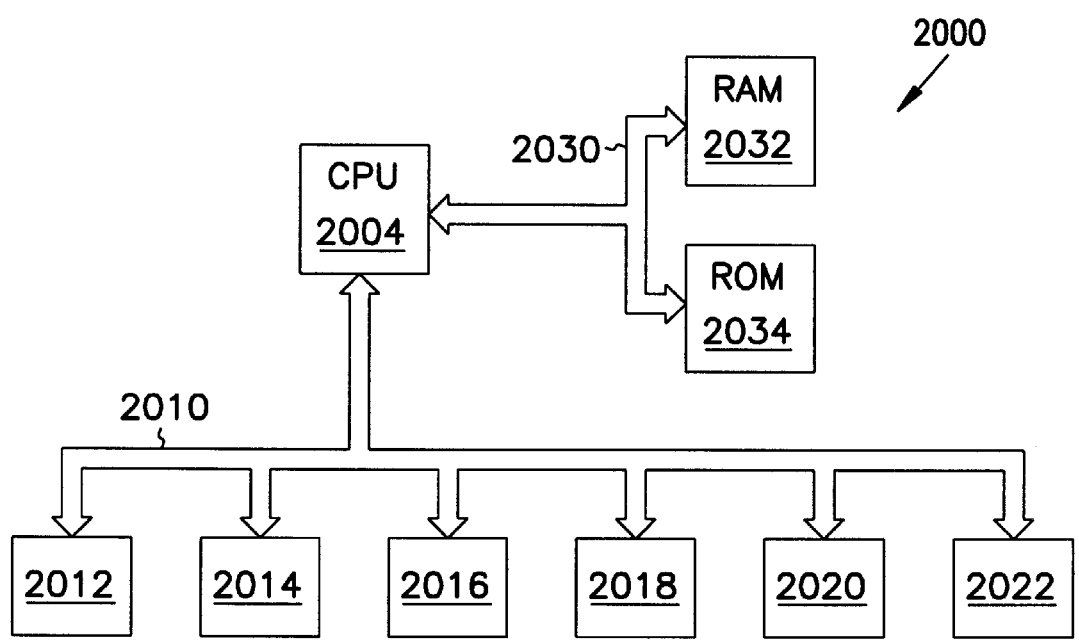
FIG. 10 is a schematic view of a computer system.

FIG. 10 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

A method for writing a plurality of sectors of information to a storage surface on a disc in a disc drive includes determining the start location for writing the plurality of sectors 910; and determining a number of skipped defective sectors that will be encountered when writing the plurality of sectors 912. A first defective sector is skipped 914 and the next logical block address is written to the next sector after the first defective sector 916. A second defective sector is skipped 918 and the next logical block address is written to the next sector after the second defective sector 920. At least two sectors of the plurality of sectors are reassigned and written to at least two sectors in a spare sector pool. Reassigning may include reassigning at least two of the last sectors of the plurality of sectors to be written to sectors within the spare sector pool 922. The first defective sector and the second defective sector are noncontiguous sectors 502, 508. The sectors of the spare sector pool may be contiguous sectors within the spare sector pool 600, 601. Reassigning may include reassigning at least two of the last sectors of the plurality of sectors to be written to the spare sector pool. The sectors in the spare sector pool also may be located a track 222 on the disc. The method also includes storing the location of the spare sectors within the spare sector pool so that they may be located at a subsequent time.

A method for writing a plurality of sectors of information to a storage surface 1351 on a disc 1341 in a disc drive 100 may also include receiving a write command to store information on a disc drive and determining a location on a recording surface where the information can be stored in a plurality of sectors addressable as logical block addresses. The information is written to sectors on the surface of the disc while skipping a plurality of defective sectors. After skipping a sector 502, the next logical block address is written to the next sector after a defective sector 502. The number of defective sectors 502, 508 skipped is determined and then at least two sectors 502, 508 of the plurality of sectors 520 to be written are reassigned and written to a pool of spare sectors 620. Many times at least two of the last sectors 509, 510 of the plurality of sectors 520 to be written are reassigned and written to the pool of spare sectors 620. At least two of the defective sectors 502, 508 encountered during writing the plurality of sectors are noncontiguous sectors. At least two of the last sectors of the plurality of sectors to be written may be written to contiguous sectors 600, 601 in the spare sector pool 620. In another embodiment, at least the number of skipped sectors of the plurality of sectors to be written are written to a spare sector pool located a track 222 on the disc 134. A number of the sectors at the end of the plurality of sectors equal to the number of skipped sectors of the plurality of sectors are reassigned and written to a number of sectors in the spare sector pool 620 equal to the number of skipped sectors of the plurality of sectors. The number of sectors in the spare sector pool 620 is also equal to the number of skipped sectors of the plurality of sectors that were to be written. The reassigned sectors in the spare sector pool 620 may be located on a track 222 on the disc 134. The location of the spare sectors 600, 601 within the spare sector pool 620 are generally stored so that the location of the spare sectors can be recovered at a later time.

A defect management system for a disc drive for managing defective sectors located on the disc surface of a disc drive 100 includes a controller 180, and a memory 182 associated with said controller 180. The memory 182 also includes a first portion storing locations of a plurality of defective sectors, and a second portion for storing an instruction set which controls a head during a write operation for writing a plurality of sectors. The controller 180 skips at least a first defective sector 502 and a second defective sector 508. At least one writable sector 503 is located between the first defective sector 502 and the second defective sector 508. The controller 180 also controls the head 150 to write at least the last two sectors of the plurality of sectors to be written to at least two contiguous sectors 600, 601 located in a pool of spare sectors 620.

The first defective sector 502 and the second defective sector 508 are located on the same track on a disc surface within the disc drive. The pool of spare sectors are located on the same track 222 on a disc surface 1364 within the disc drive 100.

Most generally, a system for managing defective sectors in a disc drive 100 includes a controller 180, and a device for locating and skipping at least a first defective sector 502 and a second defective sector 504 having at least one writable sector 503 located between the first defective sector 502 and the second defective sector 508. The device also rewrites at least two sectors following the first defective sector 502 and the second defective sector 508 to at least two contiguous sectors 600, 601 located in a pool of spare sectors 620.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for writing a plurality of sectors of information to a storage surface comprising the steps of:
    (a) determining the start location for writing the plurality of sectors;
    (b) determining a number of skipped defective sectors that will be encountered when writing the plurality of sectors;
    (c) skipping a first defective sector and writing the next logical block address to the next non-defective sector after the first defective sector;
    (d) skipping a second defective sector and writing the next logical block address to the next non-defective sector after the second defective sector; and
    (e) writing at least two sectors of the plurality of sectors and a location thereof to a spare sector pool after making only one seek to the spare sector pool.

2. The method of claim 1 wherein the writing step (e) further comprises (e)(1) writing at least two of the last sectors of the plurality of sectors to be written to the spare sector pool.

3. The method of claim 2 wherein the writing step (e) further comprises (e)(1) writing at least two of the last sectors of the plurality of sectors to be written to contiguous sectors in the spare sector pool.

4. The method of claim 1 wherein the first defective sector of skipping step (c) and the second defective sector of skipping sector (d) are noncontiguous sectors.

5. A method for writing a plurality of sectors of information to a storage surface comprising the steps of:
    (a) receiving a write command to store information;
    (b) determining a location where the information can be stored in a plurality of sectors addressable as logical block addresses;
    (c) writing the information to sectors on the surface while skipping a plurality of defective sectors, and writing the next logical block address to the next non-defective sector after a defective sector;
    (d) determining a number of defective sectors skipped;
    (e) writing at least two sectors of the plurality of sectors to be written to a pool of spare sectors after only making one seek to the pool of spare sectors; and
    (f) storing the location of the spare sectors within the spare sector pool.

6. The method of claim 5 wherein the writing step (e) further comprises (e)(1) writing at least two of the last sectors of the plurality of sectors to be written to contiguous sectors in the spare sector pool.

7. The method of claim 5 wherein at least two of the defective sectors encountered during writing step (c) are noncontiguous sectors.

8. The method of claim 5 wherein the writing step (e) further comprises (e)(1) writing a number of sectors in the spare sector pool on a track.

9. A method comprising scheduling a write operation to write information to a range of consecutive data sectors at a first location on a storage medium and, when at least two of said data sectors are defective and when said defective data sectors are nonconsecutive within the range, performing said write operation by writing a first portion of the information to the remaining non-defective sectors within the range and then writing the remaining portion of the information to at least two spare sectors in a spare sector pool, the spare sector pool disposed at a second location on the storage medium noncontiguous with the first location.

10. The method of claim 9, wherein the first location comprises a first track on the storage medium, wherein the second location comprises a second track on the storage medium, and wherein the performing step further comprises using a common data transducing head to write the first and remaining portions of the information to the respective first and second locations.

11. The method of claim 10, wherein the storage medium further comprises a third track between the first and second tracks, and wherein the performing step further comprises carrying out an intermediate seek operation to move the head from the first track, past the third track and to the second track prior to the writing of the remaining portions of the information to the spare sector pool.

12. The method of claim 11, wherein the second location is disposed adjacent a selected one of an innermost or an outermost diameter of a recording surface of the storage medium.

13. The method of claim 9, wherein the first location is disposed on a first recording surface, and wherein the second location is disposed on a different, second recording surface so that the first portion of the information is written using a first data transducing head and the remaining portion of the information is written using a second data transducing head.

14. The method of claim 13, wherein the first and second recording surfaces are axially aligned for common rotation and wherein the first and second locations comprise tracks in a common cylinder.

15. The method of claim 9, wherein the performing said write operation step further comprises storing the locations of said spare sectors in the spare sector pool.

16. A system, comprising:
    a storage medium; and
    means for scheduling a write operation to write information to a range of consecutive data sectors at a first location on the storage medium and, when at least two of said data sectors are defective and when said defective data sectors are nonconsecutive within the range, for performing said write operation by writing a first portion of the information to the remaining nondefective sectors within the range and then writing the remaining portion of the information to at least two spare sectors in a spare sector pool, the spare sector pool disposed at a second location on the storage medium noncontiguous with the first location.

* * * * *